United States Patent [19]
Suzuki

[11] Patent Number: 5,921,453
[45] Date of Patent: Jul. 13, 1999

[54] PAPER FEEDING APPARATUS IN WEB THREADING APPARATUS

[75] Inventor: Kunio Suzuki, Kanagawa, Japan

[73] Assignee: Kabushiki Kaisha Tokyo Kikai Seisakusho, Tokyo, Japan

[21] Appl. No.: 09/021,003

[22] Filed: Feb. 9, 1998

Related U.S. Application Data

[30] Foreign Application Priority Data

Aug. 15, 1997 [JP] Japan ..................................... 9-220328

[51] Int. Cl.$^6$ .............................. G03B 1/56; B65H 20/24
[52] U.S. Cl. ........................... 226/92; 226/90; 226/118.3; 226/188
[58] Field of Search ................................. 226/90, 91, 92, 226/187, 188, 118.3

[56] References Cited

U.S. PATENT DOCUMENTS

| | | | |
|---|---|---|---|
| 2,775,449 | 12/1956 | Stempel | 226/187 X |
| 3,029,992 | 4/1962 | Roman | 226/187 X |
| 3,119,300 | 1/1964 | Barocela | 226/90 X |
| 4,309,830 | 1/1982 | Vits | 226/92 X |
| 5,094,394 | 3/1992 | Saukkonen | 226/92 X |
| 5,333,771 | 8/1994 | Cesario | 226/92 |
| 5,383,591 | 1/1995 | Thibert | 226/92 X |
| 5,611,194 | 3/1997 | Wildmoser | 226/187 X |
| 5,690,264 | 11/1997 | Distefano et al. | 226/187 |

FOREIGN PATENT DOCUMENTS

| | | |
|---|---|---|
| 6-134957 | 5/1994 | Japan . |
| 8-216363 | 8/1996 | Japan . |
| 2532047 | 1/1997 | Japan . |

*Primary Examiner*—Michael Mansen
*Attorney, Agent, or Firm*—Frishauf, Holtz, Goodman, Langer & Chick

[57] ABSTRACT

A paper feeding apparatus is provided for use in a web threading apparatus of a rotary press for threading a web along a web threading path by drawing a leading end of the web using a web threading member movably provided on an outside portion of the web threading path and along the web threading path. The paper feeding apparatus includes a pair of an upstream roller and a downstream roller extending substantially parallel to a width direction of the web in the web threading path, and a driving mechanism for driving the upstream and downstream rollers in a feeding direction of the web and for ensuring that a peripheral speed of the downstream roller is at least equal to a moving speed of the web threading member. The upstream and downstream rollers are offset on an upstream side and a downstream side in a direction of the web threading path so that the web is not nipped by both the upstream roller and the downstream roller. A peripheral surface of one of the upstream and downstream rollers contacts a first side surface of the web and a peripheral surface of the other of the upstream and downstream rollers contacts a second side surface of the web, in a manner such that slipping between the rollers and the web is increased in response to a lowering of a tension on the web and such that slipping between the rollers and the web is decreased in response to an increase of the tension on the web. In addition, the upstream roller is displaceable in accordance with a variation of the tension on the web so as to constantly apply a force against the tension.

2 Claims, 3 Drawing Sheets

PAPER FEEDING APPARATUS IN WEB THREADING APPARATUS

BACKGROUND OF THE INVENTION

1. Field of the Invention

The present invention relates generally to a paper feeding apparatus for threading a web through a web threading path of a rotary press. More specifically, the invention relates to a paper feeding apparatus for feeding a web in a direction of pulling upon threading the web by pulling a leading end of a series of web using of a threading member which is movably provided along the web threading path.

2. Description of the Related Art

Paper feeding apparatus as set forth above have been disclosed in Japanese Unexamined Patent Publication (Kokai) No. Hei 6-134957, Japanese Unexamined Patent Publication No. Hei 8-216363 and Japanese Registered Utility Model No. 2532047, for example.

The paper feeding apparatus disclosed in Japanese Unexamined Patent Publication No. Hei 6-134957 is includes paper feeding roller in opposition to a web threading path, which paper feeding roller is arranged for feeding the web toward a downstream side in cooperation with a guide roller, a movable roller is provided on the downstream side of the paper feeding roller for removing slack in the web caused due to a difference of a length between an actual web threading path and a path of a web threading member, which latter path is set to be slightly longer than the former, and for providing an appropriate tension for the web.

On the other hand, the paper feeding apparatus disclosed in Japanese Unexamined Patent Publication No. Hei 8-216363 is provided with a paper feeding roller in opposition to a web threading path for feeding the web toward the downstream side by gripping the same in cooperation with the guide roller, a detecting means is provided for deflecting the extra length of the web corresponding to the difference between the actual web threading path and the path for the web threading member which is set to be slightly longer than the actual web threading path toward the downstream side, and for detecting a deflection amount for adjusting a rotation speed of the paper feeding roller on the basis of the result of detection of the deflection amount to optimize the web feeding amount during threading.

On the other hand, the paper feeding apparatus disclosed in Japanese Registered Utility Model No. 2532047 is also provided with a paper feeding roller in opposition to the web threading path. The apparatus includes driving means for driving the paper feeding roller toward and away from a holding roller for releasably holding the web. Furthermore, a control means is provided for controlling operation of the driving means for selectively moving the paper feeding roller toward and away from the holding roller for holding and releasing the web depending upon a magnitude of slacking of the web on the downstream side of the holding roller. When no slacking of the web is present on the downstream side of the paper feeding roller, the web is depressed onto the holding roller by the paper feeding roller to feed the web toward the downstream side. On the other hand, when slacking of the web is present on the downstream side of the paper feeding roller, the paper feeding roller is released away from the holding roller to interrupt feeding of the web.

In the respective publications set forth above, the following problems to be solved are present.

Namely, since the paper feeding apparatus disclosed in Japanese Unexamined Patent Publication No. Hei 6-134957 does not control feeding of the web toward the downstream side, when the web threading path is long, the magnitude of slacking of the web caused by the difference between the length of the web threading path and the path for passing the web threading member, which is slightly longer than the web threading path, increases progressively and thus slacking cannot be removed unless a large number of movable rollers are provided. Thus, this apparatus requires a large installation space and high production cost. On the other hand, by providing a large number of movable rollers, the construction becomes complicated, maintenance is troublesome, and reliability is low.

On the other hand, the paper feeding apparatus as disclosed in Japanese Unexamined Patent Publication No. Hei 8-216363 has been proposed to solve the problem encountered in the invention disclosed in Japanese Unexamined Patent Publication No. Hei 6-134957. However, the improved apparatus requires control means for electrically controlling rotation speed of the paper feeding roller depending upon slacking magnitude of the web caused by the difference between the length of the web threading path and the length of the path for passing the web threading member, which is slightly longer than that of the web threading path.

On the other hand, when control is not effected for smoothing variation of feeding speed of the web fed by the paper feeding roller, tension may be exerted on the web on the upstream side of the paper feeding roller intermittently and abruptly so that a take-up body may be excessively rotated by its own inertia moment to unnecessarily extract the web from the take-up body to droop and get stuck, or a rupture in the web may be caused due to an abruptly exerted tension.

Furthermore, the paper feeding apparatus disclosed in Japanese Registered Utility Model No. 2532047 is designed for controlling feeding of the web by the paper feeding roller depending upon the slacking amount of the web caused by the difference beteen the length of the web threading path and the length of the path for passing the web threading member, which is slightly longer than the length of the web threading path, similarly to the paper feeding apparatus disclosed in the foregoing Japanese Unexamined Patent Publication No. Hei 8-216363. This apparatus also requires control means for performing electrical control for paper feeding, thereby resulting in high production cost.

On the other hand, the apparatus disclosed in Japanese Registered Utility Model Publication No. 2532047 achieves feeding control of the web by intermittently depressing the web onto the holding roller using the paper feeding roller. Thus, contacting and releasing of the holding roller and the paper feeding roller may be a cause of vibration or other relatively undesirable mechanical disturbance. Furthermore, feeding control of the web by contacting and releasing of the holding roller and the paper feeding roller repeats feeding and stopping of feeding to exert tension on the web on the upstream side of the paper feeding roller intermittently and abruptly to cause excessive rotation of the take-up body upon stopping feeding by its own inertia moment to extract the web unnecessarily from the take-up body. The web may thus droop or get stuck, or a rupture in the web may be caused due to abruptly exerted tension.

SUMMARY OF THE INVENTION

The present invention has been worked out in view of the problems set forth above. Therefore, it is an object of the present invention to provide a paper feeding apparatus in a web threading apparatus which can autonomously perform a control of feeding of a web upon threading using a relatively simple construction without requiring electrical control means, whereby a variation of feeding speed of the web by a paper feeding apparatus can be performed smoothly, without any intermittent and abrupt exertion of the tension on the web, thereby enabling a stable and efficient web threading operation.

Another object of the present invention is to provide a paper feeding apparatus in a web threading apparatus which is low in production cost, easy to maintain, and more reliable.

According to one aspect of the present invention, a paper feeding apparatus is provided for use in a web threading apparatus of a rotary press for threading a web along a web threading path by drawing the leading end of the web using a web threading member movably provided on the outside of the web threading path and along the web threading path. The paper feeding apparatus comprises a pair of an upstream roller and a downstream roller extending substantially parallel to a width direction of the web in the web threading path, and a driving mechanism for driving the upstream and downstream rollers in a feeding direction of the web and for ensuring that a peripheral speed of the downstream roller is at least equal to a moving speed of the web threading member. The upstream and downstream rollers are offset on an upstream side and a downstream side in a direction of the web threading path so that the web is not nipped by both the upstream roller and the downstream roller. A peripheral surface of one of the upstream and downstream rollers contacts a first side surface of the web and a peripheral surface of the other of the upstream and downstream rollers contacts a second side surface of the web, in a manner such that slipping between the rollers and the web is increased in response to a lowering of a tension on the web and such that slipping between the rollers and the web is decreased in response to an increase of the tension on the web. In addition, the upstream roller is displaceable in accordance with a variation of the tension on the web so as to constantly apply a force against the tension.

In the preferred construction, the upstream roller and the downstream roller are arranged on both sides across the web threading path, and at least the downstream roller is displaceable across the web threading path, and the displaceable roller is displaced after threading the web through the web threading path defined between the upstream roller and the downstream roller.

The web threaded by action of the threading mechanism passes through the upstream roller and the downstream roller to contact with both rollers. The web is fed at a speed not lower than a threading speed at least by the downstream roller. At this time, the web is provided with a tension by the upstream roller so that feeding of the web by the paper feeding apparatus can be autonomously controlled. As a result, a significant slacking of the web will not be caused on the downstream side of the paper feeding apparatus. Furthermore, small slacking can be reduced and removed.

BRIEF DESCRIPTION OF THE DRAWINGS

The present invention will be understood more fully from a detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

In the following description, numerous specific details are set forth in order to provide a thorough understanding of the present invention. It will be obvious, however, to those skilled in the art that the present invention may be practiced without these specific details. In other instances, well-known structures are not shown in detail in order to unnecessarily obscure the present invention.

Figure 1:
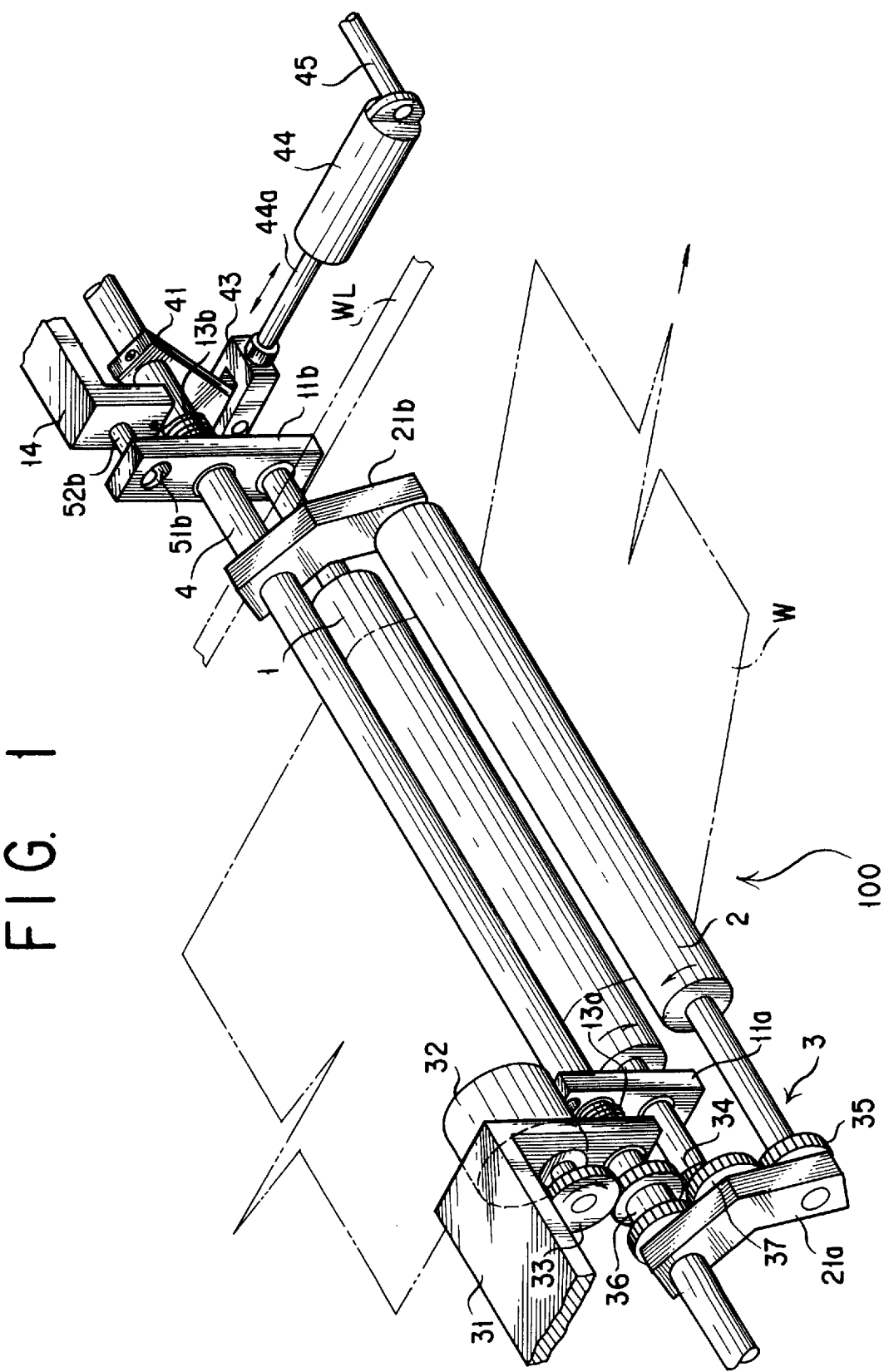
FIG. 1 is a partially omitted perspective view showing a general construction of one embodiment of a paper feeding apparatus in a web threading apparatus according to the present invention.
Figure 2:
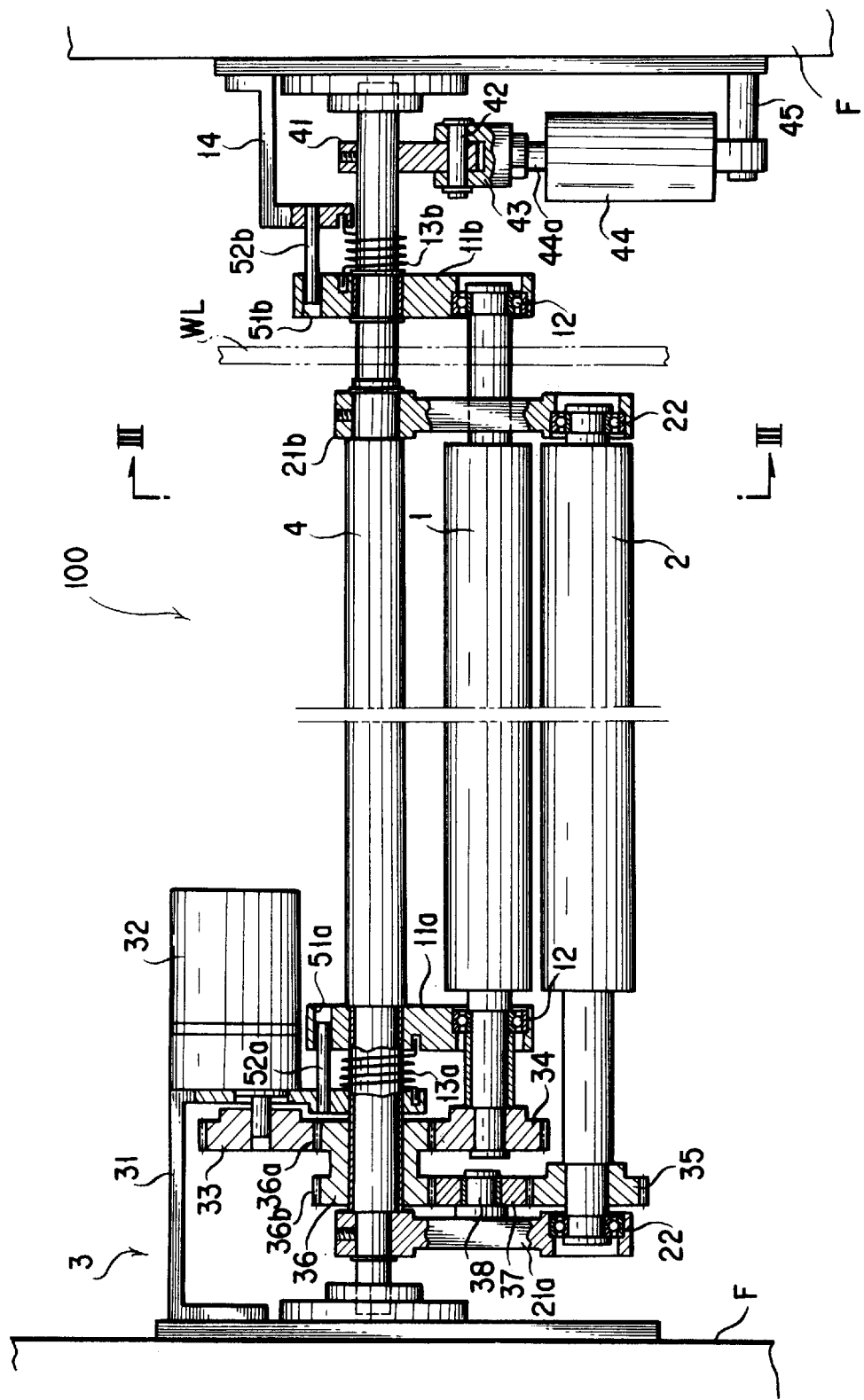
FIG. 2 is a section of the shown embodiment of the paper feeding apparatus in the web threading apparatus of FIG. 1.
Figure 3:
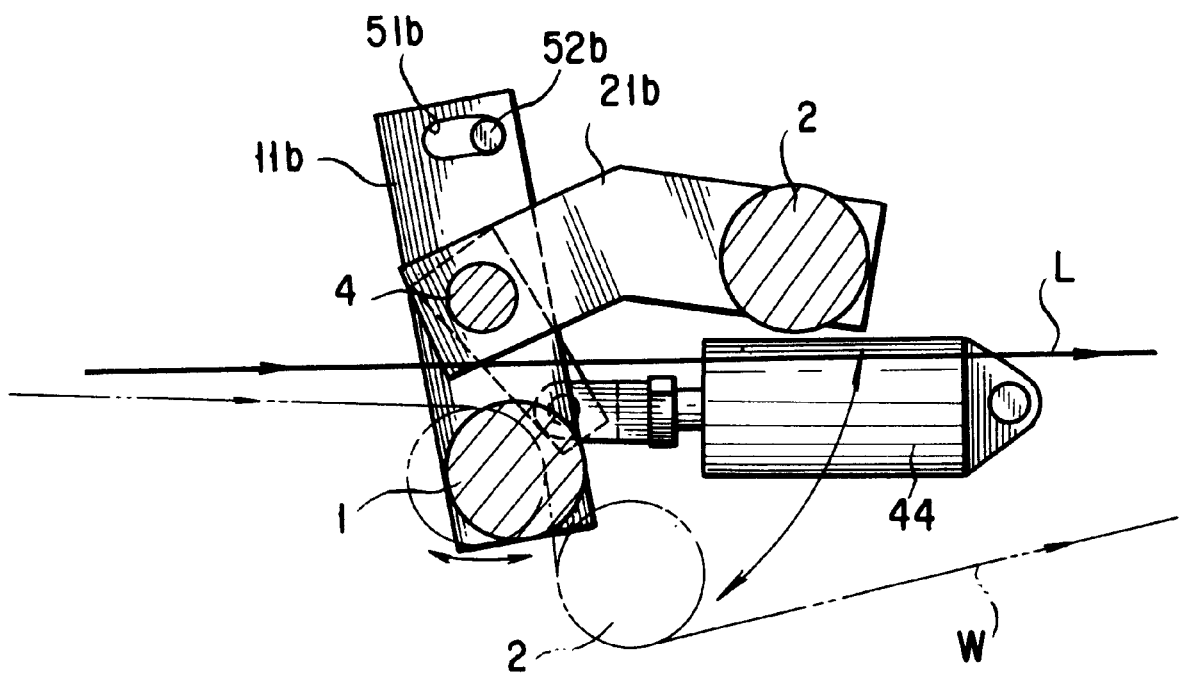
FIG. 3 is a section taken along line III—III of FIG. 2.

FIG. 1 is a partially omitted perspective view showing a general construction of one embodiment of a paper feeding apparatus in a web threading apparatus according to the present invention, FIG. 2 is a section of the shown embodiment of the paper feeding apparatus in the web threading apparatus of FIG. 1, and FIG. 3 is a section taken along line III—III of FIG. 2.

A paper feeding apparatus 100 according to the present invention, includes an upstream roller 1 and a downstream roller 2 arranged at positions mutually offset on upstream side and downstream side in a web threading direction of a web W, and a drive mechanism rotatingly driving these two rollers 1 and 2. In the shown embodiment, the upstream roller 1 is rotatably supported via bearings 12 at tip end portions of a pair of arms 11a, 11b mounted on a variable angle shaft 4 which will be discussed later, for angular displacement.

The arm 11a is biased in a counterclockwise direction in FIG. 3, by a torsion spring 13a provided substantially coaxially with the variable angle shaft 4 between one of the arm 11a and a bracket 31 of a driving mechanism 3 which will be discussed later.

On the other hand, the other arm 11b is biased in counterclockwise direction in FIG. 3 by a torsion spring 13b which is provided substantially coaxially with the variable angle shaft 4 between the arm 11b and a spring receptacle member 14 mounted on a frame F.

A range of angular displacement of both arms 11a and 11b is restricted by an appropriate stopper mechanism comprising grooves 51a and 51b respectively provided on the arms 11a and 11b and pins 52a and 52b respectively provided on the bracket 31 and the spring receptacle member 14, and exposed in either of the grooves 51a and 51b. On the other hand, two torsion springs 13a and 13b are mounted to obtain substantially equal reactive forces.

In the shown embodiment, the downstream roller 2 is rotatably supported via bearings 22 on respective end portions of arms 21a and 21b mounted on the variable angle shaft 4 for angular displacement together with the variable angle shaft 4.

The variable angle shaft 4 is mounted for angular displacement on frames F on both sides. In conjunction therewith, at a position inclined to one of the frames F, the variable angle shaft 4 is connected to an expandable rod 44a of a fluid pressure cylinder 44, such as an air cylinder, via an arm 41, a pin 42 and a crevice 43. The fluid pressure cylinder 44 is mounted on the frame F via a rod 45 for angular displacement.

Accordingly, the downstream roller 2 is displaced from a position shown by a solid line in FIG. 3 to a position shown by a dotted line, namely from one surface side of a threading path L to the other surface side of the threading path L across the threading path L, via the variable angle shaft 4 and the arms 21a and 21b.

The driving mechanism 3 is mounted on the frame F by the bracket 31. The driving mechanism is constructed with a variable electric motor as driving means 32, a driving gear 33 mounted on an output shaft of the driving means 32, a driven gear 34 mounted on axial end of the downstream roller 2 and intermediate gears 36 and 37 provided between the driving gear 33 and the driven gear 34.

In the shown embodiment, one intermediate gear 36 is rotatably mounted on the variable angle shaft 4, and is provided with two external teeth portions 36a and 36b. On the other hand, the external teeth portion 36a is meshed with the driven gear 34 mounted on the axial end of the upstream roller 1. The other external teeth portion 36b is meshed with the driven gear 35 mounted on the axial end of the downstream roller 2. The other intermediate gear 37 is rotatably provided on a shaft 38 which is provided on the arm 21a supporting one end of the downstream roller 2.

It should be noted that a web threading mechanism (not shown) for guiding a web threading member WL is provided at a position inclined to one of the frames F.

Next, discussion will be given for operation of the shown embodiment. At first, in a condition where the expandable rod 44a of the fluid pressure cylinder 44 of the paper feeding apparatus 100, the not shown web threading mechanism is actuated.

By actuation of the web threading mechanism, the web threading member WL threads the web W along the web threading path L by drawing the leading end of the web W. The web W thus threaded reaches the position of the paper feeding apparatus 100 to pass between the variable angle shaft 4 and the upstream roller 1 and a position opposing the downstream roller 2. Thereafter, by means of a (not shown) paper feeding start detecting means, a paper feeding start signal is output.

When the paper feeding start signal is output, at first, the driving mechanism 3 is actuated. Namely, the driving means 32 is actuated to rotatingly drive the upstream roller 1 and the downstream roller 2 via the driving gear 33, the intermediate gears 36 and 37 and the driven gears 34 and 35, simultaneously, so that at least the downstream roller 2 is driven to rotate at a same speed as a motion speed of the web threading member WL at the slowest, and the upstream roller 1 and the downstream roller 2 are driven to rotate in mutually opposite directions.

Subsequently, the expandable rod 44a of the fluid pressure cylinder 44 is slowly expanded so that the variable angle shaft 4, which is connected to the expandable rod 44a via the arm 41, is slowly to cause an angular displacement in a clockwise direction in FIG. 3.

By angular displacement of the variable angle shaft 4, the pair of arms 21a and 21b which are integral with the variable angle shaft 4, cause displacement of the downstream roller 2 from the position shown by the solid line in FIG. 3 to the position shown by the dotted line. Namely, the downstream roller 2 contacts with one side surface (upper surface) of the web W which is threaded along the web threading path L and then continues its movement until it reaches the stroke end of the expandable rod 44a of the fluid pressure cylinder 44, with increasing contact area with one side surface of the web W to stop at the position where the outer peripheral surface thereof is located close to the outer peripheral surface of the upstream roller 1. During this period, the other side surface (lower surface) of the web W is contacted with the outer peripheral surface of the upstream roller 1 to gradually increase the contact area with the web W to finally wrap the web W on the outer peripheral surfaces of the upstream roller 1 and the downstream roller 2 as shown by the dotted line in FIG. 3.

As they contact the web W, the upstream roller 1 and the downstream roller 2 feed the web W by a frictional force between respective peripheral surfaces of the upstream roller 1 and the downstream roller 2 and the web W.

Under such conditions, when a slacking is caused in the web located on the downstream side of the downstream roller 2 due to the difference of the length of the path of the web threading member WL and the actual web threading path L, the frictional force between the downstream roller 2 and the web W becomes smaller to make a slip between the downstream roller 2 and the web W greater. Thus, web feeding operation of the paper feeding apparatus 100 is autonomously restricted.

Accordingly, a large slacking may not be caused in the web W on the downstream side of the downstream roller 2. Also, a slight slacking may be reduced gradually to be extinguished.

On the other hand, during this period, both of the upstream roller 1 and the downstream roller 2 continue rotating at a constant peripheral speed. Therefore, feeding of the web by the upstream roller 1 and the downstream roller 2 is continued with gradually increasing and decreasing speed.

Then, at a transition from gradually increasing of the web feeding speed to gradually decreasing, a variation of the tension is caused in the longitudinal direction of the web W. A shock caused by the variation of the tension can be absorbed by permitting displacement of the upstream roller 1 in the clockwise direction against the counterclockwise direction biasing force exerted thereon by the torsion springs 13a and 13b via arms 11a and 11b.

When the web threading member WL reaches a predetermined position set in the vicinity of the terminating end of the web threading path L, the paper feeding end signal is output by a (not shown) paper feeding end detecting means. Once the paper feeding end signal is output, the expandable rod 44a of the fluid pressure cylinder 44 is gradually contracted. As a result, the downstream roller 2 is moved from the position shown by the dotted line in FIG. 3 to the position shown by the solid line. Then, both of the upstream roller 1 and the downstream roller 2 are released from the web W. In conjunction therewith, the web W returns to the predetermined web threading path L. Then, the operation of the driving mechanism 3 is terminated.

The paper feeding apparatus 100, which has been disclosed in terms of the preferred embodiment with reference to the drawings, may be provided between a paper feeding portion (not shown) of a rotary press and a printing portion (not shown), for example. On the other hand, when the web threading path is long as in a newspaper press, the web threading path L may be divided into an appropriate number of portions.

In the shown embodiment, the outer peripheral surfaces of the upstream roller 1 and the downstream roller 2 may be provided with different physical properties. Namely, the upstream roller is provided with an outer peripheral surface formed of a smoothly finished metal or the like so as to have a relatively small friction coefficient. On the other hand, the downstream roller 2 is provided with an outer peripheral surface formed of a synthetic resin or the like so as to have a relatively large friction coefficient.

Due to such differences of physical properties of the outer peripheral surfaces, the upstream roller 1 mainly acts for certainly providing sufficient contact area between the web W and the downstream roller 2, and the downstream roller 2 mainly acts for feeding the web W, to differentiate the action. On the other hand, by providing a small friction coefficient for the outer peripheral surface of the upstream roller 1, when the upstream roller 1 is displaced corresponding to the variation of the tension in the longitudinal direction of the web W, the contact surface contacting with the web W is slippery so as to be effective for smoothly absorbing the shock due to the variation of the tension.

Furthermore, in the shown embodiment, in consideration of the slip caused between the downstream roller 2 and the web W, the peripheral speed of rotation of the downstream roller 2 is set slightly higher than the moving speed of the web threading member WL. Also, by providing a slightly larger diameter for the downstream roller 2 than that of the upstream roller 1, the downstream roller is slightly higher than the peripheral speed of rotation of the upstream roller 1 so that an appropriate tension for the web W is constantly provided on the outer peripheral surface of the downstream roller 2 contacts the web W with relatively large force. Thus, the feeding of the web W by the downstream roller 2 can be performed stably.

Furthermore, in the shown embodiment, since the arms 11a and 11b supporting the upstream roller 1 are not integrally coupled, it becomes possible to differentiate the displacement amount corresponding to the difference of tensions on the web W at both sides of the upstream roller 1 when tensions in the longitudinal direction are different at both lateral sides of the web W. Accordingly, it becomes possible to correct unevenness of the tension in the longitudinal direction of the web W to prevent rupture or deviation of the web W due to unevenness of the tension.

As set forth above, with the construction according to the present invention, control of web feeding of the web can be autonomously performed in threading of the web, which smoothly varying the feeding speed corresponding to a slacking condition of the web on the downstream side.

Accordingly, tension is not exerted intermittently or abruptly on the web of the upstream side, and excessive extraction of the web or rupture thereof is avoided to enable a stable and efficient threading operation.

On the other hand, the present invention does not require electrical control and has a quite simple mechanical construction so that the apparatus may be provided at low cost, and is reliable and easy to maintain. Also, the invention is easy to use and effective for reduction of labor and lowering of running cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A paper feeding apparatus for use in a web threading apparatus of a rotary press for threading a web along a web threading path by drawing a leading end of said web using a web threading member movably provided on an outside portion of said web threading path and along said web threading path, said paper feeding apparatus comprising:

a pair of an upstream roller and a downstream roller extending substantially parallel to a width direction of said web in said web threading path; and a driving mechanism for driving said upstream and downstream rollers in a feeding direction of said web and for ensuring that a peripheral speed of said downstream roller is at least equal to a moving speed of said web threading member;

wherein said upstream and downstream rollers are offset on an upstream side and a downstream side in a direction of said web threading path so that said web is not nipped by both said upstream roller and said downstream roller;

wherein a peripheral surface of one of said upstream and downstream rollers contacts a first side surface of said web and a peripheral surface of the other of said upstream and downstream rollers contacts a second side surface of said web, in a manner such that slipping between said rollers and said web is increased in response to a lowering of a tension on said web and such that slipping between said rollers and said web is decreased in response to an increase of the tension on said web; and wherein said upstream roller is displaceable in accordance with a variation of the tension on the web so as to constantly apply a force against said tension.

2. A paper feeding apparatus in a web threading apparatus as set forth in claim 1, wherein said upstream roller and said downstream roller are arranged on both sides across said web threading path, and at least said downstream roller is displaceable across said web threading path after said web is threaded through said web threading path.

* * * * *